May 17, 1960     R. R. COOK     2,936,851
AIR PURIFIER
Filed June 7, 1957     4 Sheets-Sheet 1
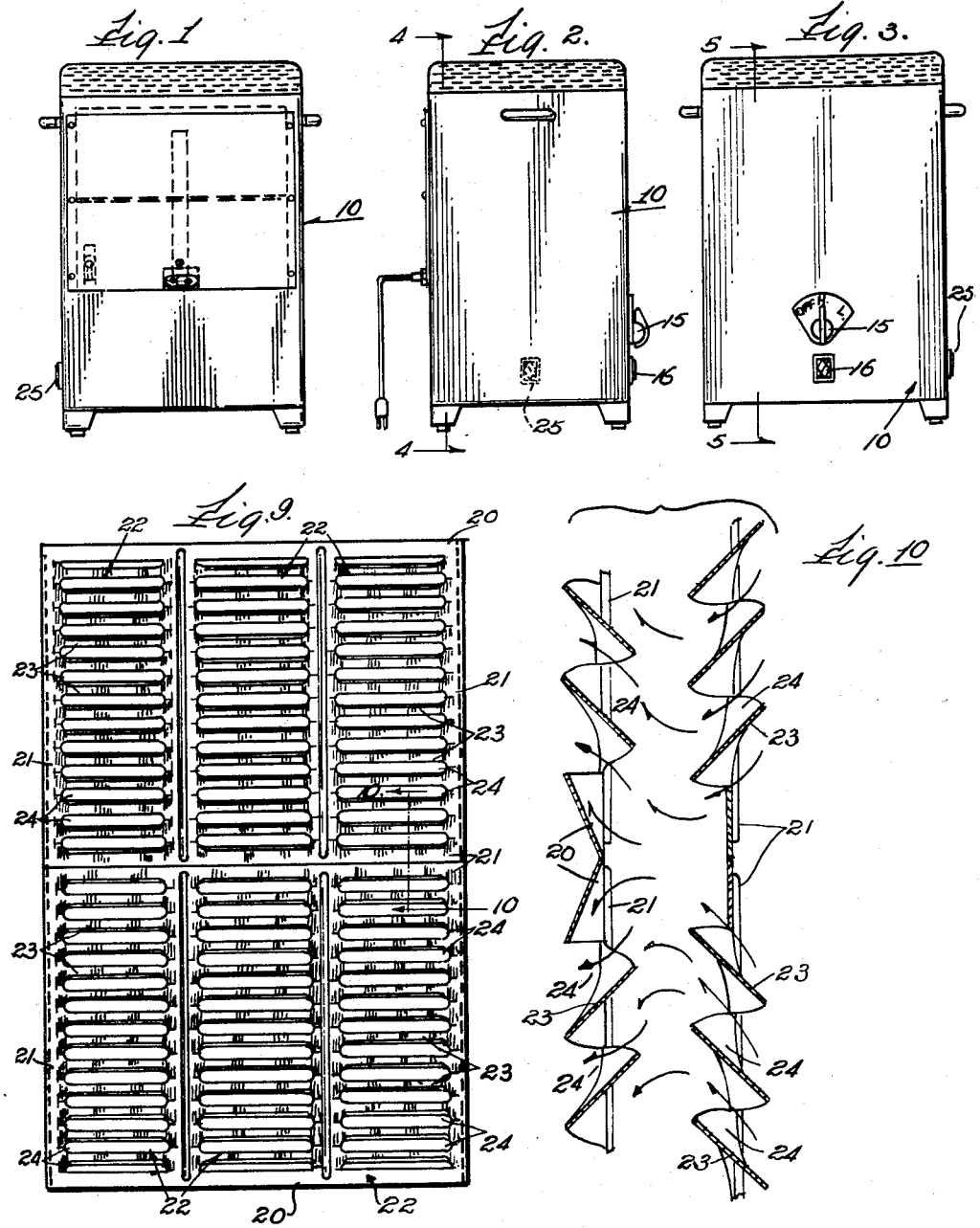
INVENTOR.
Richard R. Cook.
BY James R. McKnight
Attorney.

May 17, 1960  R. R. COOK  2,936,851
AIR PURIFIER
Filed June 7, 1957  4 Sheets-Sheet 2

INVENTOR.
Richard R. Cook,
BY James R. McKnight
Attorney

May 17, 1960 R. R. COOK 2,936,851
AIR PURIFIER
Filed June 7, 1957 4 Sheets-Sheet 3

INVENTOR.
Richard R Cook.
BY James R. McKnight
Attorney.

May 17, 1960 R. R. COOK 2,936,851
AIR PURIFIER
Filed June 7, 1957 4 Sheets-Sheet 4

INVENTOR.
Richard R. Cook,
BY
Attorney.

United States Patent Office 2,936,851
Patented May 17, 1960

2,936,851

AIR PURIFIER

Richard R. Cook, Chicago, Ill.

Application June 7, 1957, Serial No. 664,347

3 Claims. (Cl. 183—7)

This invention relates to an air purifier adapted to remove coarse dirt and lint from the air by mechanical and chemical filtration and finer dirt particles therefrom by electrostatic precipitation.

It is among the objects of my invention first to provide an efficient mechanical-chemical filter to physically remove the coarse dirt and lint from the air stream, and then to draw the air with its fine dirt particles through double louvered collector plates, which are electrically charged to set up high voltage fields which in turn charge the particles and attract them for collection on the collector plates.

My electrostatic precipitator is efficient in operation, because the air passes through widely spaced double louver collector plates creating turbulence instead of between flat tray-like plates.

Due to my construction of the mechanical-chemical filter and the collector plates, my device does not generate ozone, and thus eliminates ozone toxicity.

My air purifier is economical and may be readily installed for use either in a room for independent operation or in the duct of a furnace or an air conditioning system for warm or cold air, and provides reduced maintenance and cleaning costs.

My invention also comprises such other objects, advantages, and capabilities as will later more fully appear and which are inherently possessed by my invention. While I have described in this specification preferred embodiments of my invention, yet it is to be understood that the same are susceptible of modification and change without departing from the spirit of my invention.

Figure 4:
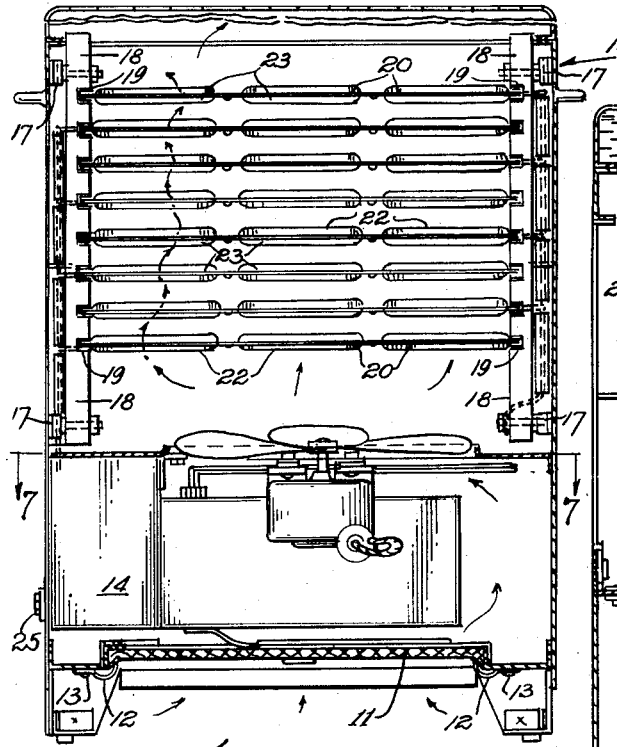
Figure 5:
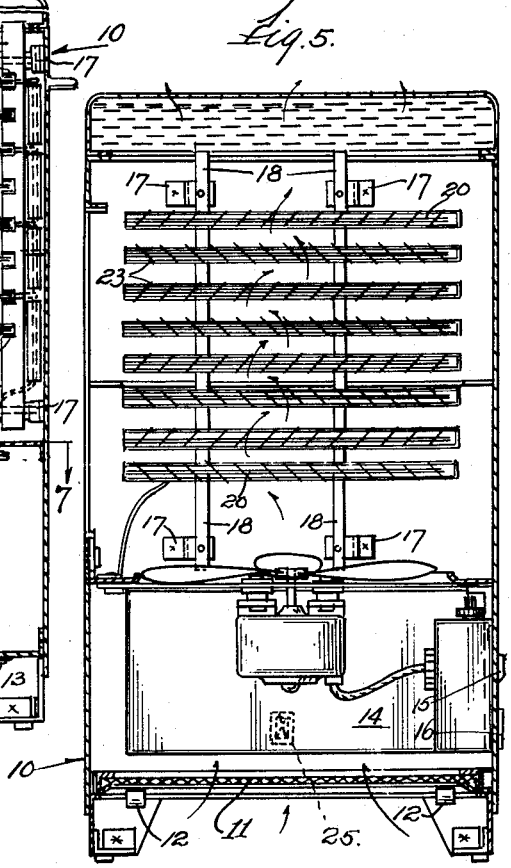
Figure 6:
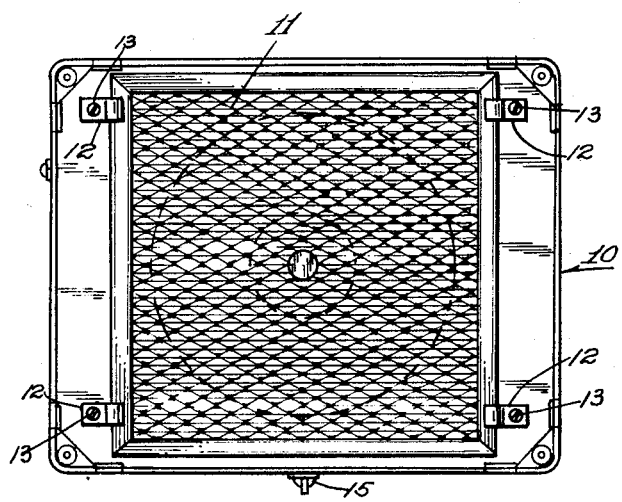
Figure 7:
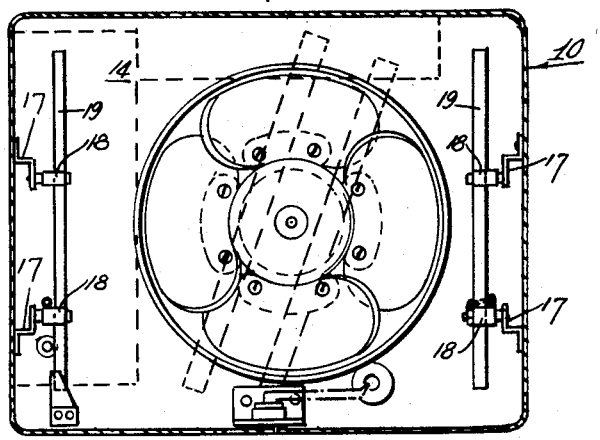
Figure 8:
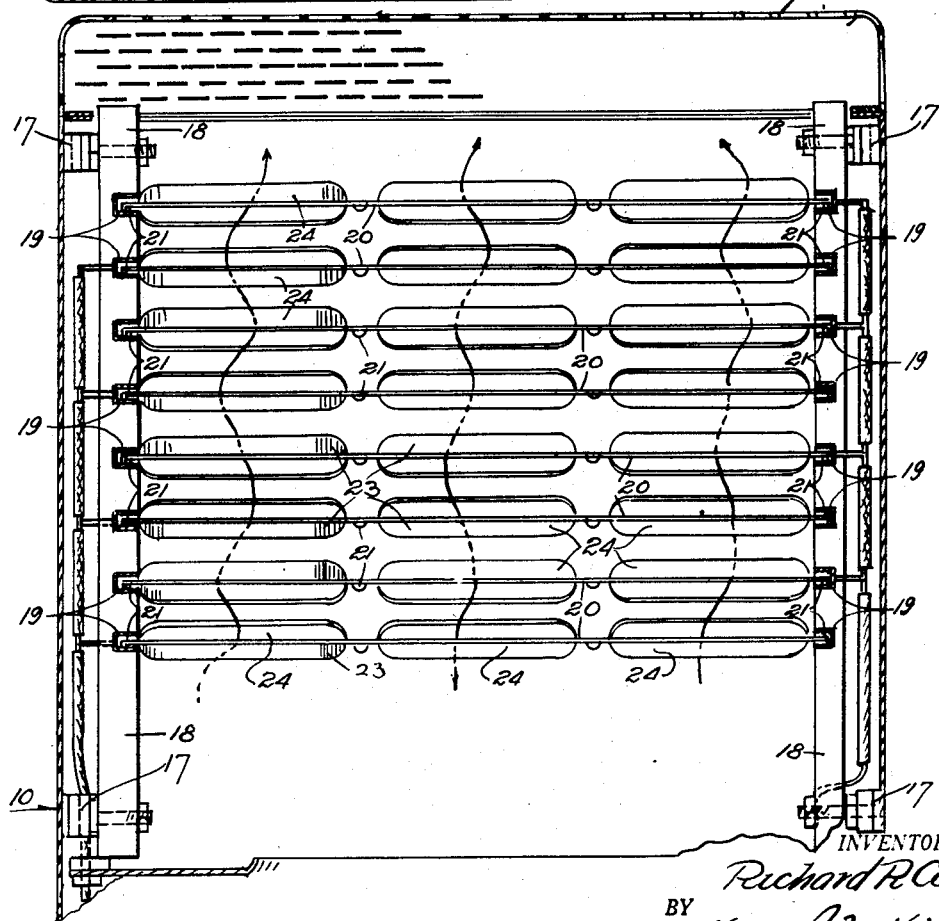
Figure 11:
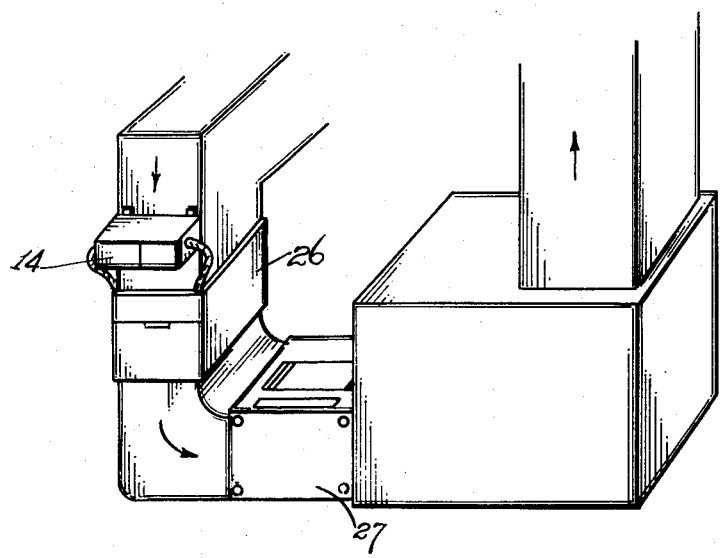

Referring to the drawings, Fig. 1 is a front elevational view of my air purifier; Figs. 2 and 3 are side and rear views of the same; Fig. 4 is a detailed enlaged vertical sectional view on line 4—4 of Fig. 2; Fig. 5 is a detailed enlarged vertical sectional view on line 5—5 of Fig. 3; Fig. 6 is a bottom plan view of my air purifier; Fig. 7 is a sectional view on line 7—7 of Fig. 4; Fig. 8 is an enlarged broken sectional view; Fig. 9 is a plan view of one arrangement of my double louver plates; Fig. 10 is an enlarged detailed partial sectional view on line 10—10 of Fig. 9; and Fig. 11 is an elevational view of my air purifier installed in a furnace or air conditioner.

An embodiment of a unit for independent use in a room comprises a body member 10 preferably formed of thin sheet metal. Body member 10 has an open bottom, or air entrance portion across which is mounted a mechanical-chemical filter 11. Filter 11 is held on a support 12 removably attached by screws 13 to the body member. Filter 11 is composed preferably of expanded washable aluminum foil. Filter 11 may be of felt, metal, paper, fiber glass or other suitable material. Filter 11 is coated with a chemical preparation which facilitates the removal of heavy or large particles from the air.

The top or air exit portion of the body member 10 is provided with a plurality of slitted openings which extend across the top and the upper sides of body member 10. This permits air to move from body member 10 outwardly into the room in all directions, so that no draft is caused.

Suitably attached to body member 10 is an electronic power supply unit 14. Unit 14 is a power pack which transforms 115 volt A.C. into 10,000 D.C. to 14,000 D.C. which is applied to alternate collector plates of my air purifier which results in a full potential difference between each adjoining pair of collector plates. An on-off switch 15 is provided at the front of body member 10 for control of electrical current to my air purifier. An indicator light 16 glows red when the purifier is turned on. Another amber bulb 25 glows brightly to indicate shorts or dirty plates. My device is adapted to be attached to any suitable source of electrical supply.

The interior of body member 10 is provided at its opposite sides with a plurality of metal brackets 17 attached thereto and extending inwardly therefrom. Attached to said brackets are a plurality of spaced notches to receive a plurality of spaced metal holding members or channels 19.

Holding members 19 extend rearwardly for substantially the entire extent of body member 10.

Slidably, removably mounted in holding members 19 are a plurality of double louvered collector plates 20 which are preferably formed of metal such as non-corrosive aluminum. Plates 20 are coated with a chemical material to facilitate the collection of impurities.

Each of my plates 20 has a margin 21 at opposite sides, at one end and in between spaced louver sections 22. Each louver section 22 has a plurality of fins 23. Each fin is formed so that its top portion extends above margin 21 and its bottom portion extends below said margin with a diagonal portion of the fin between its top and bottom. Each fin 23 is spaced from the adjacent fin by an opening 24. In one form of my louver, the top of each fin extends as far above the margin as the bottom of each fin extends below said margin.

Plates 20 are positioned in holding members 19 so that fins 22 of a plate on one level extend in the opposite direction from the fins 22 in the plate in the next adjacent level. The construction and arrangement of the plates create a turbulence in the air stream.

When my unit is of larger size, I may have two plates 20 on the same level, with the plates contacting or overlapping slightly at their respective end margins 21 as shown in Fig. 9. In this position fins 23 on one of the plates extend in the opposite direction to the fins on the adjoining plate and provide increased turbulence in the air stream.

In my construction the heavier and larger particles of dirt are removed by my mechanical-chemical filter at the entrance of my device, so only the smaller and finer dirt particles pass beyond this entrance filter.

My plates 20 are uniformly, widely spaced substantially an inch apart from each other. This width permits the air to pass rapidly with a minimum of resistance. Because the fins on alternate or adjoining plates direct the air in opposite directions, there is sufficient turbulence. The small particles are charged while passing through the electrostatic field caused by the charged collector plates and are attached to deposit on collector plates of the opposite polarity.

In prior art constructions where there is no use of an entrance mechanical-chemical filter to remove the heavier particles and flat parallel close together plates are used, the plates are soon filled with particles which causes constant sparking and the generation of considerable ozone. Frequent removal or cleaning and flushing of such plates is necessary to wash off the accumulated dirt and reduce the ozone production. With my construction the filling or blocking of the plates is minimized, if not prevented. The result is greater efficiency, economy and the elimination of sparking and the generation of obnoxious and dangerous ozone.

The mechanical-chemical filter and the collector plates are coated with a chemical solution which holds the dirt and dust and also germs and virus firmly until they are inactivated and killed. This adhesive, or coating, solution holds all particles deposited on them.

The adhesive is germicidal and fungicidal and destroys all bacteria and virus collected on the plates. It is water soluble and therefore allows the dirt to be flushed off easily under a faucet or hose. It will not dry out in hot weather and will not become fluid during humid weather. It is non-corrosive, odorless, flameproof, and electrically conductive. It will not irritate the hands. The mechanical-chemical filter and the collector plates may be easily removed, washed, recoated and replaced. The adhesive places a fine film over the mechanical-chemical filter, and the collector plates.

In use contaminated air flows into the mechanical-chemical filter where all coarse particles are removed. The partially cleaned air now moves through the field of the electrostatic plates. Here the fine particles are removed—such as lint, dust, pollen, allergenic particles, mists, molds, fluid droplets, mildew and fungus, bacteria and virus carried on the above particles as well as many other micro organisms. The cleaned air moves on to be used in the room, or if my unit is attached to a furnace or air-conditioner to be heated or cooled for distribution through the building.

My air purifier may be provided in a single unit, or a plurality of units may be assembled and even attached together by suitable bolts or angle iron braces. A single unit may be used in the room of a home, or in an office. Multiple units or custom built units are adapted for laboratories, restaurants, factories, offices, banks, hotels, telephone exchanges, bowling alleys and drug and food stores where airborne contaminates, such as allergens, pollens, and dust, must be kept to the minimum.

My air purifier either in a single unit or a plurality of units or enlargement of the same, is adapted for installation into any type of forced warm air heating or air conditioning or cooling systems. My air purifier whether in a single unit or a plurality of units is completely packaged and as such need only be fitted either vertically or horizontally into the entrance duct or the return air duct of an air heating system or an air cooling mechanism. The duct should be filled by the installation and tightly sealed to prevent air passage. No water or sewer connections are needed, but can be provided.

Where my device is used in the duct of an air heating system, or air conditioning mechanism, and the said systems, or the said mechanism has a fan, or means for the forced circulation of air, I omit my fan. The top of my body member with its slitted openings is also unnecessary and is omitted.

Where a plurality of my air purifiers are combined for use in a furnace or air cooler or for independent use in a room, I may have a single power pack 14 or may use as many power packs as needed but a single power pack for each unit is not necessarily required. I may use only one on-off switch 15 and one or more indicator lights for the combination of several units.

My unit or units may be installed in the duct of any forced air heating or cooling systems. The installation may be vertical as the unit is used ordinarily independently in a room, or it may be horizontal. The operation will be equally successful with either vertical or horizontal installation. In Fig. 11 I show my air purifier 26 installed in the duct of a furnace or air conditioner 27.

Having thus described my invention, I claim:

1. In an air purifier having a body member with an air entrance and an air exit, a plurality of spaced louver plates removably mounted within the body member, said louver plates connected to a power pack and to an electrical source of power applying high voltage to alternate plates, each of said plates having a flat margin, a plurality of spaced double louvers formed from the plate with an opening between each louver and a flat portion between each louver, each of said louvers having a diagonal fin with its upper end extending as far above said margin as its lower end extends below said margin, to cause increased turbulence in the air passing in the openings between said louvers.

2. In an air purifier having a body member with an air entrance and an air exit, a plurality of holding members attached to and widely spaced at different height levels in said body member, a plurality of louver plates removably mounted on said holding members, said louver plates connected to a power pack and to an electrical source of power applying high voltage to alternate plates, each of said plates having a flat margin, a plurality of spaced double louvers formed from the plate with an opening between each louver and a flat portion between each louver, each of said louvers having a diagonal fin with its upper end extending as far above said margin as its lower end extends below said margin, said lower plates on adjacent levels having fins extending in opposite directions to cause increased turbulence in the air passing in the openings between said louvers.

3. In an air purifier having a body member with an air entrance and an air exit, a plurality of holding members attached to and widely spaced at different height levels in said body member, a plurality of louver plates removably mounted on said holding members, said louver plates connected to a power pack and to an electrical source of power applying high voltage to alternate plates, each of said louver plates having a plurality of sections, each of said sections having a flat margin, a plurality of spaced double louvers formed from the plate with an opening between each louver and a flat portion between each louver, each of said louvers having a diagonal fin with its upper end extending as far above said margin as its lower end extends below said margin, adjacent sections having fins extending in opposite directions to cause increased turbulence in the air passing in the openings between said louvers.

References Cited in the file of this patent

UNITED STATES PATENTS

| 2,449,681 | Wilson | Sept. 21, 1948 |
| 2,486,520 | Dahlman | Nov. 1, 1949 |
| 2,729,302 | True | Jan. 3, 1956 |
| 2,778,443 | Yereance | Jan. 22, 1957 |

FOREIGN PATENTS

| 90,856 | Austria | Jan. 25, 1923 |
| 43,056 | Norway | Aug. 23, 1926 |
| 506,896 | Great Britain | June 6, 1939 |
| 113,537 | Sweden | Mar. 20, 1945 |